United States Patent
Dewan

[15] 3,662,662
[45] May 16, 1972

[54] FOCUS SENSOR
[72] Inventor: Leon Dewan, 16 West End Ave., Old Greenwich, Conn. 06870
[22] Filed: June 3, 1970
[21] Appl. No.: 42,939

[52] U.S. Cl. ..............................95/44 A, 355/55, 353/101
[51] Int. Cl. ...............................................G03b 27/52
[58] Field of Search.................95/44, 44 A; 355/55, 56; 353/101

[56] References Cited

UNITED STATES PATENTS

| | | | |
|---|---|---|---|
| 3,037,423 | 5/1962 | Shurcliff | 353/101 |
| 3,253,528 | 5/1966 | Bing | 95/44 |
| 3,416,426 | 12/1968 | Land | 95/44 |
| 3,465,661 | 9/1969 | Hahn et al. | 95/44 |
| 3,469,925 | 9/1969 | Urbach et al. | 353/101 |

*Primary Examiner*—Samuel S. Matthews
*Assistant Examiner*—Michael Harris

[57] ABSTRACT

Apparatus for sensing and automatically adjusting the focus of a photographic variable size copying machine.

An optical system identical to that of the camera is mechanically coupled to operate in parallel therewith. A photoelectric sensing system located in the plane of the photographic plate receiving light through the optical system from a light source in the plane of the negative carrier is activated by inaccuracy of focus. Signals of the photoelectric system are applied to control motor driven focusing means to restore and maintain sharp focus.

4 Claims, 12 Drawing Figures

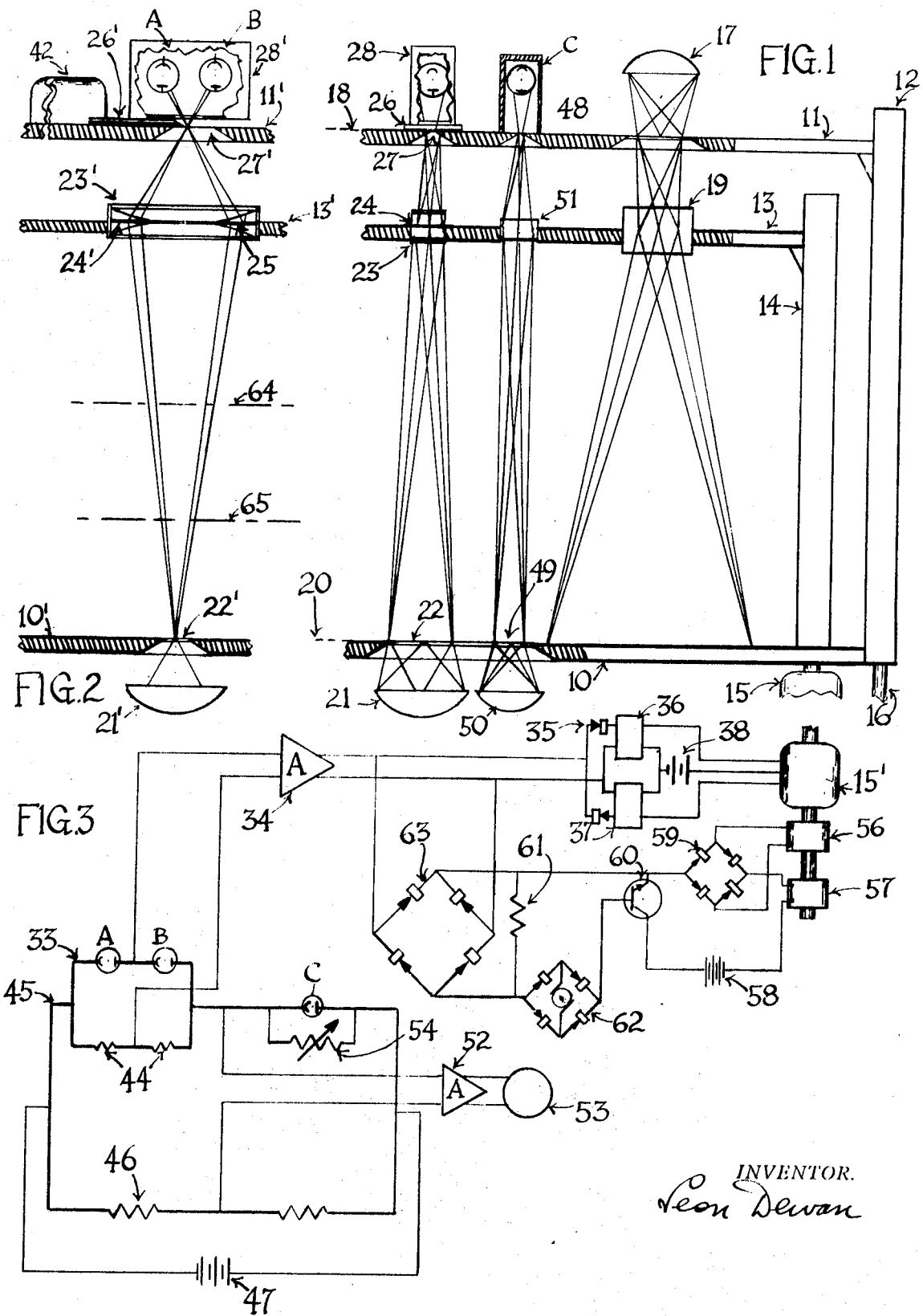

INVENTOR.
Leon Dewan

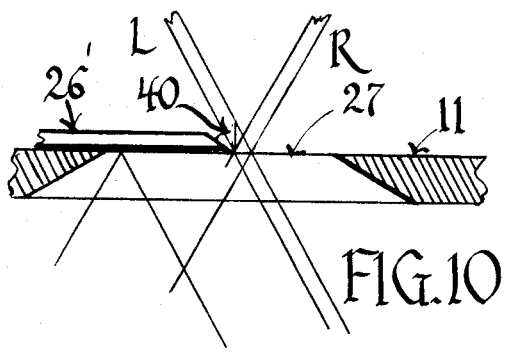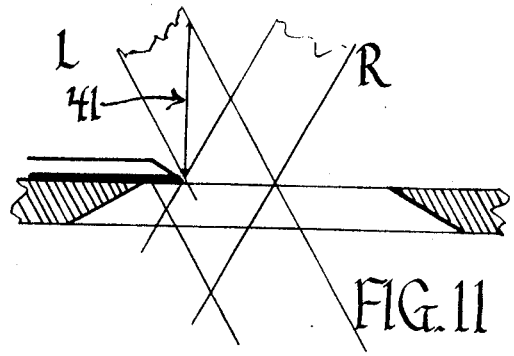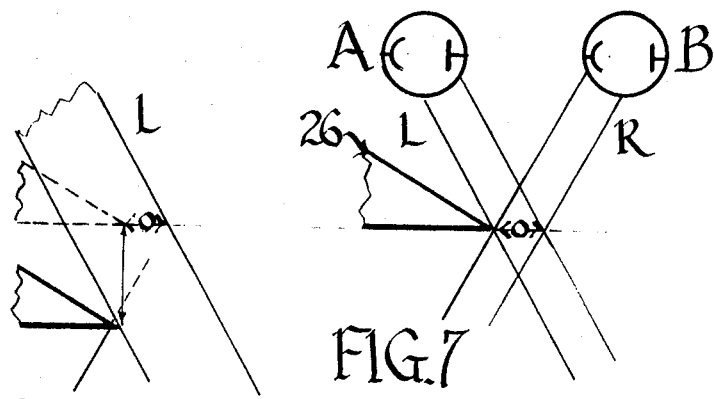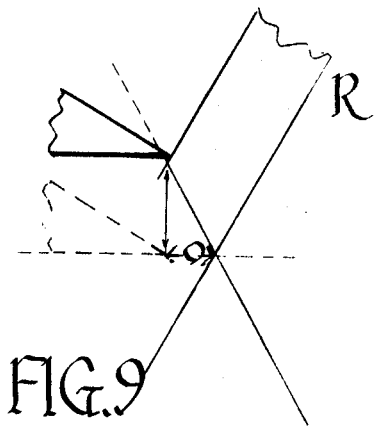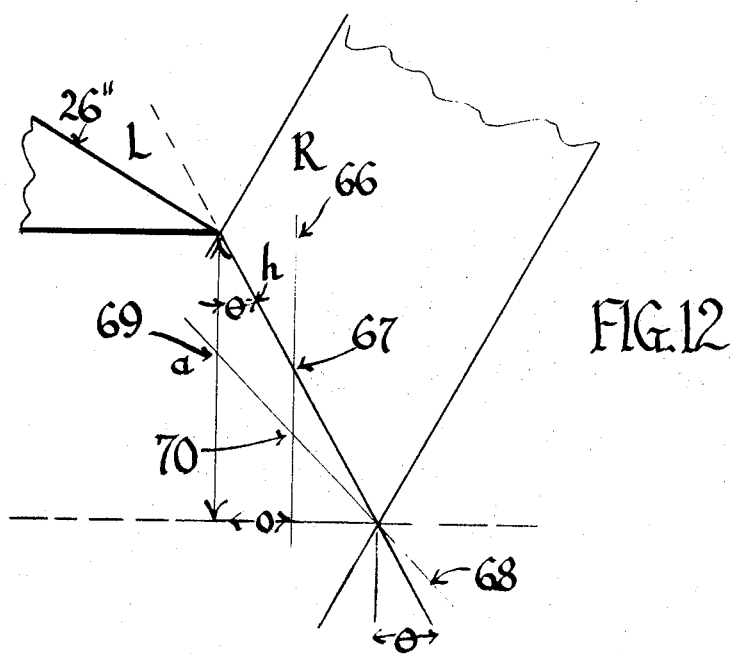

FOCUS SENSOR

This invention relates generally to photography and is directed to a means for sensing the focus of the image produced by an optical system of an object upon a desired plane such as a screen or a positive plate and to correct this focus automatically in the event that it is rendered imperfect by disturbing influences.

Another object is to obviate the need for refocusing an optical system whenever a change is made in the relative distances between the elements as for example when the ratio of magnification is varied in a photographic copying machine.

Another object is to enable unattended variable size copying machines to be coin operated by relatively unskilled persons through automatic and accurate focusing.

In such machines methods have been proposed wherein the correct distances between the negative, positive and lens carriers are maintained mechanically by linkages throughout a range of magnification but these have not proven to be sufficiently effective in producing a sharp focus at all times.

According to this invention a separate monitoring optical system paralleling the photographic optical system is mounted on the machine and consists of a light source on one plate carrier, a pair of photoelectric cells on the opposite plate carrier and a lens on the lens carrier. This lens has a focal length equal to that of the photographic objective and the optical center of both lenses are accurately aligned in the same plane.

The monitor lens is masked except for two diametrically opposed apertures located near its periphery with the result that the image of the light source comes to a focus in two converging beams upon a diaphragm that is accurately positioned in the focal plane. A narrow slitlike portion of the image is permitted to pass the edge of the diaphragm so that two beams diverging from the point of focus fall each upon one of the photocells.

When the image is focused sharply in the diaphragm plane the cells receive an equal amount of light from each beam. However if the focal plane changes in the slightest degree, falling short of the diaphragm or beyond the same the relative cross sections of the beams changes accordingly so that the photocells become unequally illuminated.

The two cells are connected in a wheatstone bridge which is in accurate balance only when the cells are equally illuminated. A shift in this balance that occurs when the equality is destroyed by change of focus energizes a servo motor to drive the lens carrier in the direction which causes the focus to return to its original position in the diaphragm plane and in doing so restore the equality of photocell illumination and the balance of the bridge. Further explanation on how this is made practically possible will appear in the detailed description.

FIG. 1 is a schematic front view illustration partly in cross section of a photographic copying machine embodying the invention.

FIG. 2 is a side view of FIG. 1 showing the monitoring optical system.

FIG. 3 illustrates the circuit whereby the monitoring system of FIG. 1 and 2 controls the motor of the copying machine that operates the focusing system therefor.

FIG. 7 is a diagram showing an enlarged side view of the edge of the diaphragm that passes a narrow section of the image of the light source. The image is sharply focussed on the diaphragm.

FIG. 8 is similar to FIG. 7 except that the diaphragm has been lowered so that the focal plane lies beyond it.

FIG. 9 is similar to FIG. 7 except that the diaphragm has been raised so that the focal plane falls short thereof.

FIGS. 10 and 11 are diagramatic side views of the diaphragm as a whole illustrating the effect of its movement over the image.

FIG. 12 is an enlarged diagram similar to FIG. 9 and illustrating in greater detail the effect of defocusing.

Figure 4:
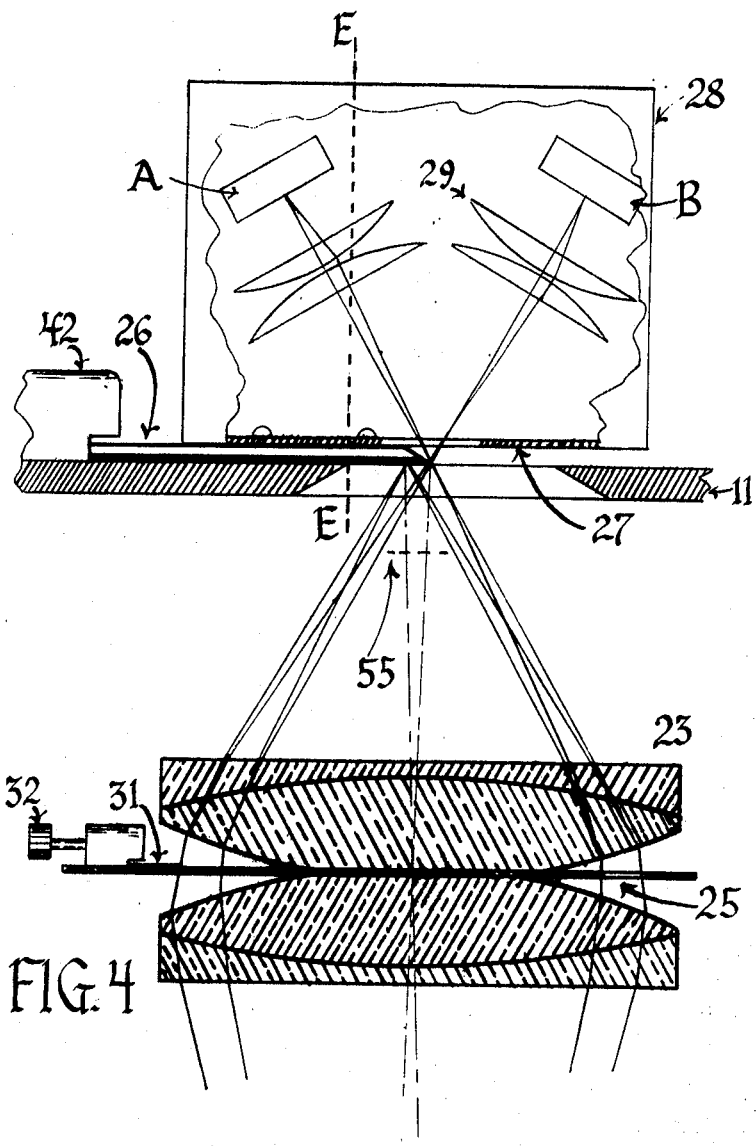
FIG. 4 is an enlarged view of the monitoring optical system of FIGS. 1 and 2 showing the photocell carrier and diaphragm with the walls of the photocell carrier broken away and the monitor lens system in cross section through line D—D of FIG. 5.

Referring to FIGS. 1 and 2, base 10 of a photographic copying machine forms the positive carrier therefor. The negative carrier plate 11 rides vertically on the upright 12 to produce the desired distance between the positive and negative carriers for the enlarging or reducing ratio required.

The lens carrier plate 13 rides on a second upright 14 and is moved to the correct vertical position by means of the motor 15 through suitable coupling (not shown). The negative carrier is moved vertically through coupling to shaft 16 which may be turned manually or by motor as the case may be.

The photographic optical system consists of a light source 17 which concentrates light on the negative focal plane 18 illuminating the negative which is imaged by the photographic objective 19 on the positive plate whose surface lies in the positive plane 20.

A second optical system for monitoring the focus consists of a light source 21 which produces a long rectangular slit of light 22 concentrated on the positive focal plane 20 (FIG. 1 shows the slit lengthwise and FIG. 2 defines its width) and a lens system 23 which images the slit 22 in the negative focal plane 18. This lens system consists of two plane convex lenses, the major part of whose centers have been ground flat to decrease the thickness and the sides cut away as seen in FIG. 1 to decrease the width. A mask 24 therebetween excludes light passage except for the two diametrically opposed apertures 25 and the optical centers of lens system 23 and the photographic objective 19 are accurately aligned in the horizontal plane so that the focus of the negative on the positive plate surface closely corresponds with the focus of the light slit image on the diaphragm 26 in the focal plane 18 at all magnification ratios.

The diaphragm 26 whose edge parallels major dimension of the light slit image covers most of said image and allows only a very narrow portion thereof to pass the edge and reach the photocells A and B.

Figure 5:
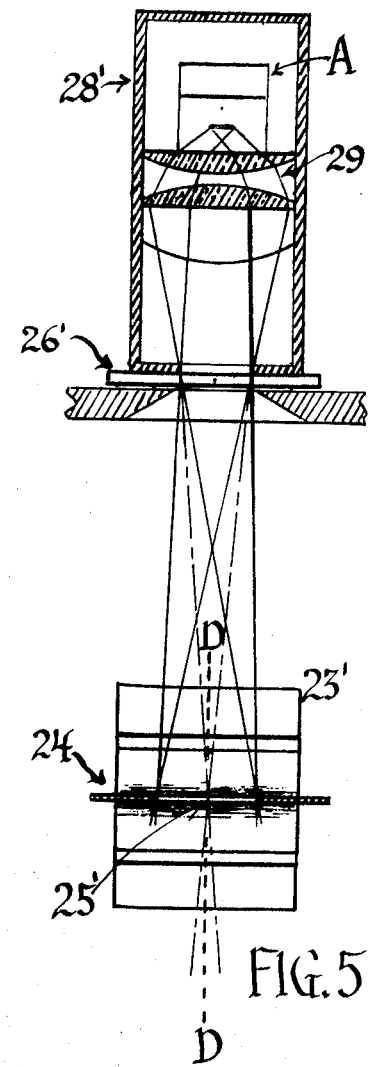
FIG. 5 is a side view of FIG. 4 with the photocell carrier in cross section through line E—E of FIG. 4.
Figure 6:
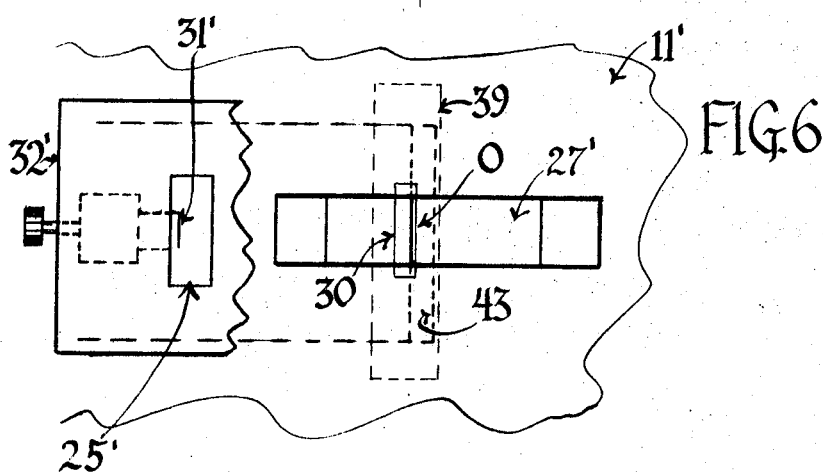
FIG. 6 is a partial view of FIG. 5 as seen from below with the monitor lens broken away to view the aperture in the base plate and the diaphragm.

FIGS. 4, 5, and 6 being enlarged views of parts of FIG. 1 and FIG. 2 illustrate the optical system in greater detail. FIG. 4 is an enlargement of the lens system as seen in FIG. 2. FIG. 5 corresponds to FIG. 1 while FIG. 6 shows FIG. 4 as seen from below. It will be seen that the diaphragm 26 rides over a rectangular aperture 27 in the negative carrier 11 and carriers thereon the housing 28 which contains the photo conductive cells A and B and lens systems 29 for concentrating light thereon.

The rectangular image 30 of the light slit 22 focused on the underside on diaphragm 26 is conveyed by two converging beams from apertures 25. The image 30 is obscured by the diaphragm save for a thin, slit like area "0" which lies between the diaphragm edge and the extreme boundary of the image. The length of this area is bounded by the edges of the aperture 27. The result is that light from the portion of the image that is allowed to pass the edge of the diaphragm diverges into two beams that are each concentrated exclusively on one of the photocells A and B.

Because the photographic and monitor lenses 19 and 23 are identical in focal length and alignment of optical centers, the sharpness of focus of the image 30 on the underside of diaphragm 26 in the focal plane 18 is accompanied by an equal sharpness of focus of the negative image on the positive plate in focal plane 20. When this condition prevails the photocells A and B receive an equal amount of light since the apertures 25 are of equal area as ensured by adjustment of the trimming tab 31 on the left hand aperture which is moved by micrometer screw 33. If however a small amount of defocusing is introduced, for example by slightly raising the negative carrier 11, the equality of light on the photocells is destroyed. This is more clearly illustrated by FIGS. 7, 8, and 9 which show a section of the extreme edge of the diaphragm enlarged while the two converging light beams are each shown as a parallel sided beam for simplicity.

FIG. 6 illustrates the condition where the image is exactly focused on the focal plane 18 coinciding with the underside of the diaphragm 26. The image is relatively wide but is mostly covered by the diaphragm so that only the narrow section "0" is exposed. This permits beam R to pass upward to photocell A and beam L to photocell B. These beams are of equal cross section and equally energize the photocell.

FIG. 9 illustrates what occurs with defocusing, in this case when the negative carrier with the diaphragm 26 is slightly raised. As the diaphragm rises, the cross section of beam L decreases and that of beam R increases till at the point shown, the beam L has been completely blocked while the beam R has doubled its former size. The original position of the diaphragm is shown in dotted lines.

FIG. 8 illustrates the result of lowering the negative carrier. It is the beam R that now decreases and the beam L that increases so that cell B is in the dark and cell A is doubly illuminated.

The inequality of illumination resulting from defocusing is employed to cause restoration of sharp focus in the following manner as illustrated in FIG. 3. The photocells are connected in the wheatstone bridge 33 which is in balance only when both cells are equally illuminated which is the case when the image 30 is in sharpest focus on the plane 18. When defocusing produces inequality of illumination the resulting imbalance of the bridge 33 energizes the reversible motor 15 through amplifier 34 to activate the lens carrier 11 vertically in the direction that restores the sharpness of focus and consequent equality of illumination on the photocells. Thus the focus on the diaphragm 26 and consequently the focus on the photographic plate in plane 20 is continually kept sharp by restorative up and down movement of the lens carrier 11.

The amplifier 34 is of a type whose output follows the polarity of the output of the bridge 33 as it becomes imbalanced in either direction. This alternating polarity signal is applied through oppositely connected rectifiers 35 to the relay switches 36 and 37 which connect forward or reverse voltages to the motor 15 from power source 38. The relay switches 36 and 37 (which may be of an electronic type) are adjusted to close at a very small input and open at zero. Thus it requires only a slight imbalance of the bridge 33 to switch the motor from forward to reverse or back again and to apply an energy absorbing anti-momentum braking at the instants of perfect bridge balance.

The sensitivity of the restorative action is a function of the convergence angle of the two beams that form the image on the diaphragm and the narrowness of the portion "0" of the image that is allowed to pass the diaphragm. The convergence angle is made ample by providing a fairly large diameter monitor lens 23. On the other hand if the position of the diaphragm 26 is kept fixed in the horizontal plane the exposed section "0" could not be maintained small in the face of various magnification ratios of the optical system. For example, as shown in FIG. 6 the rectangular image 30 may be represent the one produced at the lowest magnification ratio and the position of the diaphragm as shown would allow a thin sliver of width "0" to pass. But at a greater magnification ratio the larger image 39 would be produced and if the diaphragm remains fixed in position the exposed area beyond the diaphragm edge would be many times larger.

The value of keeping the exposed area "0" of the image small is illustrated in FIG. 10 and 11 which in diagram show two conditions: one in FIG. 10 where the exposed area and the image is small and light reaches photo cells A and B in two narrow diverging beams, and the other in FIG. 11 where the exposed area is large and the two beams are consequently wide. The effect of defocusing in the case of FIG. 9 by raising the diaphragm till its edge completely blocks the beam and completely unbalances the illumination of cells A and B is measured by the line 40. On the other hand in the case of FIG. 11, to produce the same effect of completely blocking beam L and doubling beam R, would require an upward movement of the diaphragm as measured by line 41 which exceeds line 40 in length.

In order therefore to keep the exposed area of the image small the diaphragm is moved by the motor driven activator (details ommited for simplicity) 42 back and forth in accordance with change of magnification. For example as indicated in FIG. 6, when the image is magnified from the size 30 to size 39 the diaphragm is correspondingly moved over automatically to a new position 43 indicated by dotted lines to produce a smaller exposed area "0," and thus limit the cross section of the beams reaching the photocells.

This automatic positioning of the diaphragm is accomplished as follows: the wheatstone bridge 33 comprising the photocells A and B and the balancing resistors 44 is in turn connected as a whole to form in effect one of the resistors of a larger wheatstone bridge 45, which includes the photocell C and two balancing resistors 46. The battery 47 powers the whole bridge system.

The photocell C serves to measure the unit intensity of any image formed by the optical system as it is ranged through various magnification ratios. It is positioned on the machine to receive light through a small hole 48 in the negative carrier plate. A bright round light source 49 on the positive plane formed by lamp 50 is imaged by the lens 51 on the hole 48 which is smaller than the smallest image that this system produces. Thus the photocell C also acts to measure the relative unit intensity of the image thrown on the diaphragm 26 as the magnifying ratios are changed.

The output of the bridge 45 when it is imbalanced acts upon the amplifier 52 to energize the motor 53 which actuates the diaphragm mover 42 to move the diaphragm leftward or rightward according to the directions of the bridge imbalance.

The system operates as follows: consider the machine to be set at the highest enlargement ratio (the negative carrier 11 at the highest position) with the focus sharp and the bridge system in balance. Then as a lower ratio is initiated by lowering the negative carrier the small bridge 33 keeps its balance only by operating the motor 15 to lower the lens carrier 11 accordingly and maintain equality of illumination of cells A and B. In the meantime the image formed on the diaphragm enlarges thus tending to increase the width of the exposed area "0." This increases the cross sectional area of two beams illuminating the photocells equally and as a result the bridge 33 as a whole increases in conductivity thereby tending to imbalance the large bridge 45 which in turn energizes the diaphragm activator motor 53 through amplifier 52. This causes the diaphragm to move to the right and keep the exposed area "0" of the image small in order to keep the bridge 45 balanced.

If the photocell C were replaced by a resistor the action would be imperfect for the following reason: as the magnifying ratio changes and the exposed area of the image accordingly increases to make cells A and B more conductive and thereby cause action that would restore the said area to its original width there is also a decrease in the unit intensity of the image as a whole as it grows. This decrease would modify the restorative action so that as the change goes on, the bridge 45 would maintain balance with an increasingly larger exposed area "0." The inclusion of photocells C however introduces an opposite and equal factor in the bridge 45 since the effect of decrease of image intensity on cells A and B is counteracted by a similar effect in cell C.

The resistance of photocell C can be caused to equal that of photocells A and B in series while the adjustable resistor 54 shunting photocell C can be equal to the series resistance of balancing resistors 44. Under these conditions the exposed section "0" of the image will remain the same width as the image changes in size and the diaphragm moves over. However if it is desired that the exposed area increase somewhat in width as the image grows, it is only necessary to increase the resistance of photocell C and decrease the value of resistor 54 accordingly, keeping the resistance of the combination the same as before. This will decrease the compensating effort of photocell C and cause the width of the exposed area "0" to slightly increase and decrease with corresponding increase and decrease of magnification.

It is not necessary that great accuracy be built into the system of bridge 45 just described since the horizontal movement of the diaphragm 26 as shown in connection with FIGS. 10 and 11 does not affect the balance of illumination of cells A and B. The movement simply ensures that the focus sensor remains sensitive at different magnifications.

The vertical movement of the lens carrier 11 must be quickly responsive to large changes in the system caused by varying the magnification ratio. At the same time the motor 15 must be so controllable as to stop suddenly without overshooting when the lens carrier has reached the point where sharp focus has been attained.

For example suppose that it is desired to increase the enlargement ratio of the machine and to do this by quickly raising the negative carrier 11. The instant that the diaphragm 26 rises above the focal plane of the monitor lens 23, the light beam L to photocell A is reduced and cut off while the beam on photocell B is greatly intensified. The resulting imbalance of the bridge 33 energizes the motor 15 to cause the lens carrier to follow the upward motion of the negative carrier. The lens carrier would lag somewhat behind the moving negative carrier in which case the image formed by the monitor lens would focus below the diaphragm at plane 55, and only the beam R, greatly intensified, would pass upward. The motor 15 attains a high speed. When the negative carrier is suddenly stopped at the desired level, the lens carrier shortly catches up and at a certain instant the image plane meets the diaphragm to produce a sharp focus thereon. If the racing motor is unchecked its momentum would carry the negative carrier far beyond the mark even though the torque of the motor exerted is reversed the moment that the point of sharp focus point is passed. Each reversal of the movement of the negative carrier thereafter would tend to overshoot the mark.

This tendency to hunt is overcome as follows: on the shaft of motor 15 is mounted a small AC generator 56 and a brake 57 preferably of the type which is operated by the magnetizing of iron powder suspended in oil. The brake is capable of being energized by the battery 58 and also by the generator 56 whose output is rectified by the full wave bridge 59 and applied in series with the break. The battery and brake are connected in series with the emitter-collector circuit of the transistor 60. The base-collector circuit of the transistor includes the resistor 61 and the DC voltage source 62 which tends to forward bias the transistor. On the other hand the output of the amplifier 34 which is controlled by the bridge 33 acts through the full wave rectifier 63 upon resistor 61 to reverse bias the transistor.

The result is that as long as the bridge 33 remains unbalanced in either polarity it maintains a condition of reverse bias and the transistor blocks the generator 56 and battery 58 from operating brake 57. However the moment that the bridge is perfectly balanced or very nearly so the resulting absence of reverse bias voltage from amplifier 34 permits the forward bias furnished by the DC source 63 to prevail. The transistor becomes conductive and the brake is given a strong impulse from the combined power of the battery 58 and the generator 56 whose output is high because of the racing motor. The suddenly applied brake friction would tend to stop the lens carrier a very short distance past the perfect focus point whereupon the reversal of the motor would return it more slowly to the exact point. In this state the brake is operated constantly or somewhat intermittently as slight perturbations of the system occur. The generator 56 plays no role during stable periods since its purpose is only to provide high braking power in connection with large changes.

When the copying ratio of the machine is unity, the positions of the negative carrier and lens carrier are indicated by the dotted lines 64 and 65 respectively.

If the machine is to produce reduced copies the negative carrier is still raised increasingly above position 64 for increased reduction ratio as it is for enlargement but the lens carrier must be moved correspondingly downward toward the positive plate 10 to maintain proper focus and to thus end the connection from the amplifier 34 to motor 15 must be reversed from that used in enlargement. The monitor lens 23 will now produce an enlarged image of the light source 22 upon the diaphragm 26 rather than a reduced on as formerly.

An alternate mode of operation is to invert the monitoring optical system from the position shown in FIG. 1 and FIG. 2, namely to install the diaphragm and photocell assembly on the stationary base or positive plate and the light source 21 of the movable negative carrier. In such a case the imbalance of light on photocells A and B would be produced by the approach and recession of the real image formed at the convergence of the two beams relative to the diaphragm rather than vertical movement of the diaphragm itself.

FIG. 12 is a diagram similar to that of FIG. 9 showing how the sensitivity of the system is directly proportional to the convergence angle of the two beams from the monitor lens and inversely proportional to the width of the exposed portion "0" of the slit image. Here the diaphragm 26 has been lifted above the focal plane 18 of the image by a distance represented by the line $a$, at which point the beam L has been completely obscured so that only one photocell remains illuminated. The sensitivity depends on how small a defocusing or separation between the diaphragm and the image focal plane will produce a given imbalance and it can be expressed as $1/a = \tan \theta/\text{``0''}$ where $\theta$ is one half of the beam convergence angle.

Thus for example if "0" is reduced by having the diaphragm operate in the vertical plane indicated by line 66 the beam L would be completely obscured when the diaphragm edge reaches point 67 in a shorter distance than indicated by line $a$. Again if the convergence angle of the beams were increased, as indicated by line 68, complete obscuration would have occurred when the diaphragm edge reached the point 69 at the original width of "0" or at point 70 when "0" is reduced thus further decreasing the amount of defocusing necessary to unbalance the system and produce a restorative signal.

As an example of the order of sensitivity that can be expected suppose the beams converge at 80° making $0 = 40°$ and the exposed portion of the image width = 0.004 inch. According to equation $1/a = \tan \theta/\text{``0''}$ the distance $a$ required to produce a full imbalance of bridge 33 equals 0.005 inch. Assuming the bridge system as a whole to be accurate within 2 percent of its full swing, the focus accuracy could then be maintained within only 0.0001 inch.

A sharply monochromatic filter to shade the photocells will increase accuracy.

What is claimed is:

1. In a device for determining the focus of an optical system having an objective lens mounted for axial movement, and a carrier mounted for axial movement in the objective plane of said lens, that improvement including a second objective lens mounted for movement with said first objective lens and in the plane thereof, a light source mounted for projection and directed at second objective lens, a photo detection system mounted in the focal plane of the second lens and positioned to receive illumination from said light source, said photo detection system being adapted to generate a signal related to the degree of focus of the light source imaged by said second lens in said focal plane, and means controlled by said signal to control the focus of the first objective lens.

2. A device as described in claim 1, and in which the photo detection system comprises a pair of axially displaced photo detectors, an opaque light barrier asymmetrically placed in the objective plane of the second lens and means for comparing the intensity of light received by each of said photo detectors, said comparison means generating said signal.

3. In an optical projection system including an object carrier, an objective lens to image the object in a focal plane, means for changing the axial distance between the object carrier and the focal plane for varying the size of the image thereat, and an objective lens carrier for moving the objective lens axially between the object and the focal plane, that improvement consisting of a second objective lens mounted on said lens carrier for axial movement with the first objective lens and in the plane thereof, a light source mounted for projection and directed at said second objective lens whereby said second lens images said light source in the focal plane thereof, a photo detection system for controlling the movement of said lens carrier mounted in the focal plane of the second lens, said photo detection system generating a signal related to the degree of focus of said second lens and means to move the object carrier to vary the distance of said carrier from the focal plane to change the size of the projected image, and means controlled by said signal to direct the lens carrier to a new position intermediate of the object carrier and the focal plane whereby the new distances established thereby between the object carrier and the lens carrier on one hand and the lens carrier and the focal plane on the other are correctly related to produce the same sharpness of focus that prevailed before said operative change was made.

4. A device as described in claim 3 and in which the photo detection system consists of an opaque barrier intercepting a part of the image of the light source formed by the second objective lens, a pair of photo detectors receiving light rays from another part of said image whereby the intensity of the light upon each photo detector is varient in relation to the other in response to axial movement of the light source by virtue of the non-paraxial rays emanating from he second lens and forming the image in its focal plane.

* * * * *